United States Patent Office 2,871,205
Patented Jan. 27, 1959

2,871,205

RECLAIMING OF VULCANIZED SCRAP RUBBER

Ivan Mankowich, Cheshire, Leo E. Steinle, Beacon Falls, and Frank P. Chiavetta, West Cheshire, Conn., assignors to United States Rubber Company, New York, N. Y., a corporation of New Jersey No Drawing. Application May 21, 1954
Serial No. 431,592

4 Claims. (Cl. 260—2.3)

This invention relates to improvements in the reclaiming of vulcanized scrap rubber, and more particularly to the preparation of a reclaim having improved properties with respect to non-staining, and also cleanliness, quality, lowering of tailings content, and an improved running rate.

Practically all reclaimed rubbers have the common property of staining other lighter colored objects and materials with which they come in contact. For many uses such staining is quite harmful and, if not overcome, seriously restricts the use of the reclaim. This problem is particularly acute in white sidewall tires. For example, certain components of the original rubber compound, such as accelerators and antioxidants, are normally staining ingredients in the reclaim and when used in a tire carcass adjacent to the white sidewall layer, cause discoloration and staining. This action is often accelerated upon exposure to light, especially sunlight. The reclaimer, confronted with a raw material of unknown history, finds it difficult, if not impossible, and expensive, to make a distinction between scraps containing staining chemicals and those that do not. By the present invention the non-staining properties of a reclaim made from scrap that may contain normally staining ingredients is vastly improved. Also the present invention improves the cleanliness and quality of the reclaim, markedly improves the running rate, i. e., permits faster passing through the refiners and sheeting rolls, and lowers the tailings content.

According to the present invention, the vulcanized rubber scrap is treated before, during, or after the conventional rubber reclaiming process, such as the "digester" process, the "heater" process, or the so-called "mechanical" process, with a chemical that effectively reduces the staining or discoloring characteristics of the reclaim.

In the usual "digester" process, a charge of ground vulcanized rubber scrap and about 100 to 300 parts by weight of water per 100 parts of scrap, or a solution of a cellulose-destroying chemical, such as caustic soda, calcium chloride, or zinc chloride, is heated under pressure in a closed steam jacketed container equipped with an agitator until the fiber in the scrap is partially or wholly destroyed, and the rubber becomes plasticized. The charge is then washed free from any such added chemicals, and is dried and milled. In the usual "heater" process, ground rubber scrap in a dried, or somewhat moistened condition (about 1 to 10 parts by weight of water per 100 parts of scrap), is heated with live steam under pressure in trays or pans in an autoclave until the rubber becomes plasticized. The plasticized scrap is then removed from the "heater" and milled. The so-called mechanical process is essentially a mechanical working of the dry rubber scrap at elevated temperature, as in the "Hot Banbury" process or in the "Reclaimator" process. The reclaiming in the "digester" or "heater" or so-called mechanical process may take place at the usual reclaiming temperature of at least 300° F. In general, the "digester" and "heater" reclaiming take place at temperatures from about 300° F. to about 420° F., and the temperature of the mechanical reclaiming process may go higher to about 550° F. In these processes, the ground scrap may be mixed with conventional celulose-destroying or defiberizing agents, softening oils, plasticizers or chemical reclaiming agents, which of course should be non-staining, before reclaiming, i. e., before heating for a time sufficient to materially soften the scrap and convert the rubber into a plastic material that is capable of being revulcanized.

In carrying out the present invention, the vulcanized scrap rubber, which may be a natural or synthetic rubber, or a mixture thereof, is reclaimed in the presence of certain aldehydes, or the finished reclaim is treated at reclaiming temperature of 300° F. or higher (to 550° F., generally to 420° F.) with the aldehyde. The aldehyde may be formaldehyde, paraformaldehyde, methylal, acetaldehyde, paraldehyde, acrolein, chloral or aldol. The aldehyde will form non-staining reaction products with the normally staining ingredients of the reclaim. Thus the aldehyde used for treating the scrap should not be combined with other materials, as in the condensation or reaction products of aldehydes with hydrazines or amines, which are known reclaiming aids but which do not reduce the staining characteristics of the reclaim. Also, the presence of a free aldehyde group alone in a compound does not necessarily impart non-staining characteristics; e. g., isobutyraldehyde, heptaldehyde, furfural and benzaldehyde do not give non-staining reclaims. The amount of aldehyde used to effectively reduce the staining properties of the reclaim is not critical, and generally will be in the range from 0.2% to 35%, and preferably from 3% to 5%, based on the weight of the scrap.

The synthetic rubber in the scrap that may be treated according to the present invention may be the product of the emulsion polymerization in the presence of a free radical catalyst of the peroxide or azo type of one or more butadienes-1,3, for example, butadiene-1,3, 2-methyl-butadiene-1,3 (isoprene), 2-chloro-butadiene-1,3 (chloroprene), 2,3-dimethyl-butadiene-1,3, piperylene, or a mixture of one or more such butadienes-1,3 with one or more other polymerizable compounds which are capable of forming rubber copolymers with butadienes-1,3, for example, up to 70% by weight of such mixture of one or more compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadiene-1,3 hydrocarbons are aryl olefines, such as styrene and vinyl naphthalene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride. Common commercial synthetic rubbers of this type are GR-S (copolymer of a major proportion of butadiene and a minor proportion of styrene), Paracril (copolymer of a major proportion of butadiene and a minor proportion of acrylonitrile), and neoprene (polymerized chloro-2-butadiene-1,3). The synthetic rubber may also be the product of the polymerization of a mixture of a major proportion of isoolefin and a minor proportion of conjugated diene at low temperature in the presence of a Friedel-Crafts polymerization catalyst of the type of aluminum chloride or boron trifluoride. An example of a commercial synthetic rubber of this type is Butyl rubber which is a copolymer of about 96 to 99.5 parts of isobutylene and correspondingly 4 to 0.5 parts of isoprene.

The following examples illustrate the invention. All parts and percentages referred to herein are by weight:

*Example I*

Four samples, A, B, C and D, of 100 parts each of cracked whole tire fiber-containing scrap in which the rubber content was about 40% GR-S and 60% natural rubber, were each separately mixed with 18.5 parts of non-straining rubber softening oils (terpenes and mineral spirits), 10.5 parts of non-straining plasticizer (pine products-gum and wood rosin), 4.8 parts of calcium chloride, and 225 parts of water. The charges were loaded into jacketed, agitated autoclaves and heated five hours at about 200 pounds per square inch jacket pressures (about 388° F.) to produce fully reclaimed rubbers. At the end of the five hour reclaiming period 5.35 parts, 10.7 parts and 21.4 parts of 37% aqueous formaldehyde was added to samples A, B and C, respectively, in the digester and all the digesters were given an additional hour heating at 388° F. After normal discharge from the digesters, the stocks were washed, dried and refined. Ninety-two parts each of the thus prepared stocks A, B, C and D were each compounded with 3 parts of additional non-staining plasticizer and 5 parts activated carbon. Sufficient of the thus compounded reclaims to provide 100 parts of rubber hydrocarbon were then compounded with 5 parts of zinc oxide, 2 parts of stearic acid, 3 parts of sulfur, 0.5 part of mercaptobenzothiazole, and 0.2 part of diphenylguanidine, and were vulcanized for 25 minutes at 287° F. in sheet form 0.1" thick.

Test strips 1" x 4" x 0.1" thick were cut from the cured reclaim samples A, B, C and D, dipped in a white lacquer "Body White High Gloss Lacquer DHL-8000" (manufactured by Pittsburgh Plate Glass Co., Ditzler Color Division), and hung to drain and dry for one hour. The test strips were then exposed to the light of two GE-RS, 275 watt sun lamps (bottom of the lamps being 15" from the surface to be exposed) placed so that the center of each lamp was over the desired center of exposure. The test samples were placed, narrow edge in, on a 12" diameter table rotating at 2 R. P. M. Marking strips, circular, approximately 2" wide and 11" and 5" in diameter, respectively, were then placed and clamped on the samples. The exposed area was between the two masking strips. The entire system was enclosed and vented using a blower for circulation of air. Test strips were exposed to the sun lamps for 20 minutes and 60 minutes, respectively. The exposed strips were then examined under the test light of a Model #610, Serial #2520, Photovolt Corp. Reflectance Meter. The reflectance meter was calibrated with a standard block of known reflectance and readings on the exposed samples were taken directly. The whiter the stock, the brighter the reflectance. This is reported as percentage, 100% being standard for the control or blank, i. e., not treated according to the present invention (sample D). Any value above 100% is an improvement.

The following table shows the result of reflectance measurements on samples A, B, C and D.

| Sample | Reflectance (Percent) | |
|---|---|---|
| | 20 min. Exp. | 60 min. Exp. |
| A | 113.3 | 116.5 |
| B | 114.0 | 120.3 |
| C | 116.8 | 125.1 |
| D (control) | 100 | 100 |

*Example II*

Reclaims E, F, G and H were made by digesting in autoclaves for five hours similarly to Example 1 samples from the following recipe: 100 parts of cracked whole passenger tire fiber-containing scrap in which the rubber content was about 40% GR-S and 60% natural rubber, 18.5 parts of rubber softening oils (terpenes and mineral spirits), 10.5 parts of plasticizer (gum and wood rosin), 4.8 parts of zinc chloride, 225 parts of water. The addition of 10.7 parts of 37% aqueous formaldehyde was made to the digester after about one hour (sample E), after about 2.5 hours (sample F), and incrementally throughout the five hour digestion period (sample G). Sample H (control) was not treated with formaldehyde.

Reflectance tests on the above reclaims compounded and cured similarly to Example I gave the following results:

| Sample | Reflectance (Percent) | |
|---|---|---|
| | 20 min. Exp. | 60 min. Exp. |
| E | 112.5 | 119.1 |
| F | 113.3 | 119.1 |
| G | 113.3 | 119.1 |
| H (control) | 100 | 100 |

*Example III*

Cracked whole passenger tire fiber-free scrap, the rubber content of which was about 40% GR-S and 60% natural rubber, was reclaimed for five hours similarly to Example I but with 18.7 parts of 37% aqueous formaldehyde added to the digester with the initial charge, and without formaldehyde addition for the control.

Reflectance tests on cured samples of the reclaim similarly to Example I gave 117.5% and 123.2% for the 20 and 60 minute exposures, respectively, as compared to 100% for the controls.

*Example IV*

Cracked 100% GR-S tire fiber-containing scrap reclaimed and tested as in Example III gave reflectance test values of 122.1% and 133.6% for the 20 and 60 minute exposures, respectively, where the 18.7 parts of 37% aqueous formaldehyde was added with the initial charge, as compared to 100% for the controls where no formaldehyde was added to the charge.

*Example V*

Cracked 100% natural rubber tire fiber-containing scrap reclaimed and tested as in Example III gave reflectance test values of 113.2 and 121.0 for the 20 and 60 minute exposures, respectively, where 18.7 parts of 37% aqueous formaldehyde was added to the initial charge, as compared to 100% for the controls where no formaldehyde was added to the charge.

*Example VI*

Cracked whole passenger tire fiber-containing scrap in which the rubber content was about 40% GR-S and 60% natural rubber was reclaimed according to the recipe and procedure of Example II with the exception that different aldehydes were added to the various initial charges in amounts per 100 parts of the scrap, as follows: Sample I, 10.1 parts of acetaldehyde; sample J, 12.9 parts of acrolein; sample K, 33.9 parts of chloral; sample L, 20.2 parts of aldol; sample M, 17.5 parts of methylal. No formaldehyde was added to the control N.

Reflectance tests on cured samples of the reclaims similarly to the other examples gave the results set forth in the following table:

| Sample | Reflectance (Percent) | |
|---|---|---|
| | 20 min. Exp. | 60 min. Exp. |
| I | 101.0 | 106 |
| J | 109.8 | 113.5 |
| K | 116.0 | 128 |
| L | 101.9 | 105 |
| M | 105.5 | 111.8 |
| N (control) | 100 | 100 |

Example VII

Cracked whole passenger tire fiber-containing scrap in which the rubber content was about 40% GR–S and 60% natural rubber was reclaimed for five hours according to the recipe and procedure of Example I. After the five hour reclaiming period and without aldehyde treatment, the autoclave contents were blown down, washed and dried. Various 4500 gram samples of the dried reclaim particles without sheeting were treated in seven and one-half gallon jacketed autoclaves at temperatures over 300° F. for one hour under different conditions of aldehyde additions with water or organic solvent according to the present invention as shown in the following table:

| Sample | Grams Water Charged | Grams Acetone Charged | Grams Formaldehyde, 37 Percent | Grams Paraformaldehyde | Treatment Temperature, °F. |
|---|---|---|---|---|---|
| O | 11,000 | None | 935 | None | 340 |
| P | 11,000 | None | 935 | None | 360 |
| Q | 11,000 | None | 935 | None | 375 |
| R | None | 640 | None | 362 | 330 |

Reflectance tests on the above treated reclaims O to R, and on an untreated control S, compounded and cured similarly to the other examples, gave the results set forth in the following table:

| Sample | Reflectance (Percent) | |
|---|---|---|
| | 20 min. Exp. | 60 min. Exp. |
| O | 111.0 | 117.6 |
| P | 112.7 | 120.4 |
| Q | 112.7 | 123.1 |
| R | 108.2 | 112.9 |
| S (control) | 100 | 100 |

One hundred parts of GR–S peelings (tread cut from tire) ground to 6-mesh were reclaimed by heating four hours at about 388° F. in a seven and one-half gallon digester in the presence of 142 parts of acetone, 10 parts of paraformaldehyde and 1 part of zinc chloride (sample T). A second batch was similarly reclaimed by heating in the presence of the acetone but without the paraformaldehyde and zinc chloride addition to show the effect on the staining properties of the acetone alone (sample U). Samples of reclaims T and U and a sample of the raw ground peelings without treatment (sample V) were compounded according to the recipe of Example I and heated at 287° F. for 25 minutes in sheet form 0.1″ thick. Test strips of the three thus treated samples were dipped in the white lacquer, dried and exposed to the ultraviolet source for 20 minutes similarly to Example I. The samples were examined for stain. On a basis of a one to ten range, the unterated sample V was assigned a 10 rating and the aldehyde treated sample T was assigned a one rating. Sample U digested with acetone alone merited an 8 rating. These data show that the major reduction of stain producing ingredients stemmed from the aldehyde and not the acetone medium. Additional experiments were conducted reducing the acetone level to ⅕ and ⅒ respectively of the amount employed in Sample T without any significant change in the amount of stain reduction. Other organic solvent media may be similarly employed, e. g., hydrocarbons, carbon tetrachloride, mineral spirits, benzene, terpenes, etc.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. In the process of preparing a reclaimed scrap vulcanized rubber from vulcanized scrap rubber by heating the scrap at temperature from 300° F. to 550° F. to plasticize the same, the step which comprises heating the scrap at temperature from 300° F. to 550° F. during the reclaiming treatment of said rubber in the presence of a chemical selected from the group consisting of formaldehyde, paraformaldehyde, methylal, acetaldehyde, paraldehyde, acrolein, chloral and aldol, thereby forming in-situ non-staining reaction products of normally staining accelerator and antioxidant ingredients of the reclaim with said chemical, said scrap rubber being selected from the group consisting of natural rubber, homopolymers of butadienes-1,3-copolymers of mixtures containing butadienes-1,3 with up 70% of such mixtures of compounds which contain a $CH_2=C<$ group and are copolymerizable with butadienes-1,3, and copolymers of a major proportion of an isoolefin and a minor proportion of a conjugated diene.

2. In the process of preparing a reclaimed scrap vulcanized rubber from vulcanized scrap rubber by heating the scrap at temperature from 300° F. to 550° F, to plasticize the same, the step which comprises heating the scrap at a temperature from 300° F. to 550° F. during the reclaiming treatment of said rubber in the presence of free formaldehyde thereby forming in-situ non-staining reaction products of normally staining accelerator and antioxidant ingredients of the reclaim with said formaldehyde, said scrap rubber being selected from the group consisting of natural rubber, homopolymers of butadienes-1,3, copolymers of mixtures containing butadienes-1,3 with up to 70% of such mixtures of compounds which contain a $CH_2=C<$ group and are copolymerizable with butadienes-1,3, and copolymers of a major proportion of an isoolefin and a minor proportion of a conjugated diene.

3. In the process of preparing a reclaimed scrap vulcanized rubber from vulcanized scrap rubber by heating the scrap in an autoclave in the presence of 100 to 300 parts of water per 100 parts of the scrap at temperature from 300° F. to 420° F. to plasticize the same, the step which comprises heating the scrap in an autoclave at temperature from 300° F. to 420° F. during the reclaiming treatment of said rubber in the presence of 100 to 300 parts of water per 100 parts of the scrap and in the presence of a chemical selected from the group consisting of formaldehyde, paraformaldehyde, methylal, acetaldehyde, paraldehyde, acrolein, chloral and aldol, thereby forming in-situ non-staining reaction products of normally staining accelerator and antioxidant ingredients of the reclaim with said chemical, said scrap rubber being selected from the group consisting of natural rubber, homopolymers of butadienes-1,3, copolymers of mixtures of butadienes-1,3 with up to 70% of such mixtures of compounds which contain a $CH_2=C<$ group and are copolymerizable with butadienes-1,3, and copolymers of a major proportion of an isoolefin and a minor proportion of a conjugated diene.

4. In the process of preparing a reclaimed scrap vulcanized rubber from vulcanized scrap rubber by heating the scrap in an autoclave in the presence of 100 to 300 parts of water per 100 parts of the scrap at temperature from 300° F. to 420° F. to plasticize the same, the step which comprises heating the scrap in an autoclave at temperature from 300° F. to 420° F. during the reclaiming treatment of said rubber in the presence of 100 to 300 parts of water per 100 parts of the scrap and in the presence of free formaldehyde thereby forming in-situ non-staining reaction products of normally staining accelerator and antioxidant ingredients of the reclaim with said formaldehyde, said scrap rubber being selected from the group consisting of natural rubber, homopolymers of butadienes-1,3, copolymers of mixtures of butadienes-1,3 with up to 70% of such mixtures of compounds which contain a $CH_2=C<$ group and are copolymerizable with butadienes-1,3, and copolymers of a major proportion of an isoolefin and a minor proportion of a conjugated diene.

References Cited in the file of this patent

UNITED STATES PATENTS

| | | |
|---|---|---|
| 1,532,213 | Winkelmann | Apr. 7, 1925 |
| 2,321,114 | Teft | June 8, 1943 |
| 2,343,558 | Kirby | Mar. 7, 1944 |
| 2,343,559 | Kirby | Mar. 7, 1944 |
| 2,427,063 | Mighton et al. | Sept. 9, 1947 |
| 2,478,827 | Johnson et al. | Aug. 9, 1949 |
| 2,493,518 | Baldwin | Jan. 3, 1950 |
| 2,609,359 | Spraks et al. | Sept. 2, 1952 |
| 2,640,035 | Brown et al. | May 26, 1953 |
| 2,653,916 | Elgin et al. | Sept. 29, 1953 |
| 2,794,006 | Naudain et al. | May 28, 1957 |